United States Patent
Apollonsky et al.

(10) Patent No.: US 7,302,431 B1
(45) Date of Patent: Nov. 27, 2007

(54) CONFIGURABLE ARCHITECTURE FOR MANAGING CORPORATE AND INDUSTRY KNOWLEDGEBASES

(75) Inventors: Alex Apollonsky, Rego Park, NY (US); Nicolas Badino, San Jose, CA (US); Warren Braunig, Shreveport, LA (US); Karl Cremin, San Jose, CA (US); Eric Hoffert, South Orange, NJ (US); Hemang Nadkami, San Jose, CA (US); Ramesh Seshadri, Santa Clara, CA (US); Brian Strull, Los Gatos, CA (US)

(73) Assignee: The Procter & Gamble Company, Cincinnati, OH (US)

( * ) Notice: Subject to any disclaimer, the term of this patent is extended or adjusted under 35 U.S.C. 154(b) by 507 days.

(21) Appl. No.: 10/028,856

(22) Filed: Dec. 21, 2001

(51) Int. Cl.
*G06F 17/30* (2006.01)
(52) U.S. Cl. .................. 707/10; 707/104.1; 707/1
(58) Field of Classification Search .............. 702/1–10, 702/100, 101, 104.1; 705/36; 709/202, 709/203; 345/356
See application file for complete search history.

(56) References Cited

U.S. PATENT DOCUMENTS

| | | | |
|---|---|---|---|
| 6,208,345 B1 * | 3/2001 | Sheard et al. ............... | 345/853 |
| 6,532,465 B2 * | 3/2003 | Hartley et al. ................ | 707/10 |
| 6,643,652 B2 * | 11/2003 | Helgeson et al. ............. | 707/10 |
| 6,766,334 B1 * | 7/2004 | Kaler et al. ................ | 707/203 |
| 2004/0054610 A1 * | 3/2004 | Amstutz et al. .............. | 705/36 |

OTHER PUBLICATIONS

Amstutz et al. U.S. Appl. No. 60/333,528, filed Nov. 28, 2001.*

* cited by examiner

*Primary Examiner*—Neveen Abel-Jalil
(74) *Attorney, Agent, or Firm*—Leonard W. Lewis

(57) ABSTRACT

A method, apparatus, and system are provided for the customers, along with the host, to have the ability to not only configure and tailor the host knowledgebase, but also the environment in which the knowledgebase is delivered. According to one embodiment of the present invention, a configurable architecture may comprise a host instance, one or more customer instances, a remote configuration engine for a content factory to deliver data comprising content and associated metadata to the host instance, which may deliver the metadata to one or more customer instances, and a customer configuration engine for the customer instance to configure and tailor the data and the environment in which the data is delivered to the needs and wants of the customer corresponding to the customer instance.

9 Claims, 7 Drawing Sheets

Configurable Architecture 300

CONFIGURABLE ARCHITECTURE FOR MANAGING CORPORATE AND INDUSTRY KNOWLEDGEBASES

COPYRIGHT NOTICE

Contained herein is material that is subject to copyright protection. The copyright owner has no objection to the facsimile reproduction of the patent disclosure by any person, as it appears in the Patent and Trademark Office patent files or records, but otherwise reserves all rights to the copyright whatsoever.

BACKGROUND OF THE INVENTION

1. Field of the Invention

The present invention relates to a configurable architecture for managing corporate and industry knowledgebases for a set of customers, in general, and more specifically to providing customers with the ability to configure and tailor the configurable architecture such that host knowledgebase as well as the environment for delivering the knowledgebase may be configured and tailored.

2. Description of the Related Art

Most methods and apparatus available today for configuring and tailoring data allow customers to configure data applications only to a limited extent. The methods and apparatus available today fail to provide the ability to configure flexibly configure workflow for readymade projects/templates, create new projects/templates, or to configure the environment, which may include customer instances corresponding to each of the customers along with a host instance, each according to its needs and requirements. Therefore, when encountering changing circumstances or needs, the application is required to be reprogrammed frequently by the application provider to create a new set of readymade projects/templates within the application, or the customer is required to obtain another version of the application. Furthermore, none of the methods and apparatus available today deploys a host instance for all the customers to access along with corresponding customer instances for each of the customers to access and modify as well as combinations of data and application elements from both host and customer instances.

For example, an application provider serves a customer with multiple users, such as a brand manager and vice president of marketing. The application provider provides the customer with workflow models, and the customer in turn provides the workflow models to its users. In other words, the brand manager that focuses on direct marketing promotions in the consumer packaged goods industry gets a workflow model associated with his specific area of work, and the vice president of marketing that focuses on advertising initiatives gets a workflow model specific to her specific area of work. Although specific to customers' and users' needs, such workflow models are based on application provider-defined material. The methods and apparatus available today do not provide the customer the ability to modify the application provider-defined or default material with customer-defined material using a corresponding customer instance. In other words, for example, if the vice president of marketing wants or needs to redefine certain workflow model fields, the application provider would have to either reprogram the workflow model or provide the vice president with another version of the application.

Some methods and apparatus available today provide for customization of software codes rather than configuration. For example, enterprise software packages provided for in-house deployment at the client site, and application service provider delivery models both require that software codes, such as new patch, upgrade or application (developed and delivered) be customized rather than configured. In other words, such models do not provide high levels of tailoring without software code customization, and consequently, fail to reduce the cost and time associated with such efforts.

Further, none of the methods and apparatus available today allow the customers to configure a marketing knowledgebase of documents, metadata, application work processes, as well the environment; or to configure the manner in which that knowledgebase interacts with ready made projects/workflow templates.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
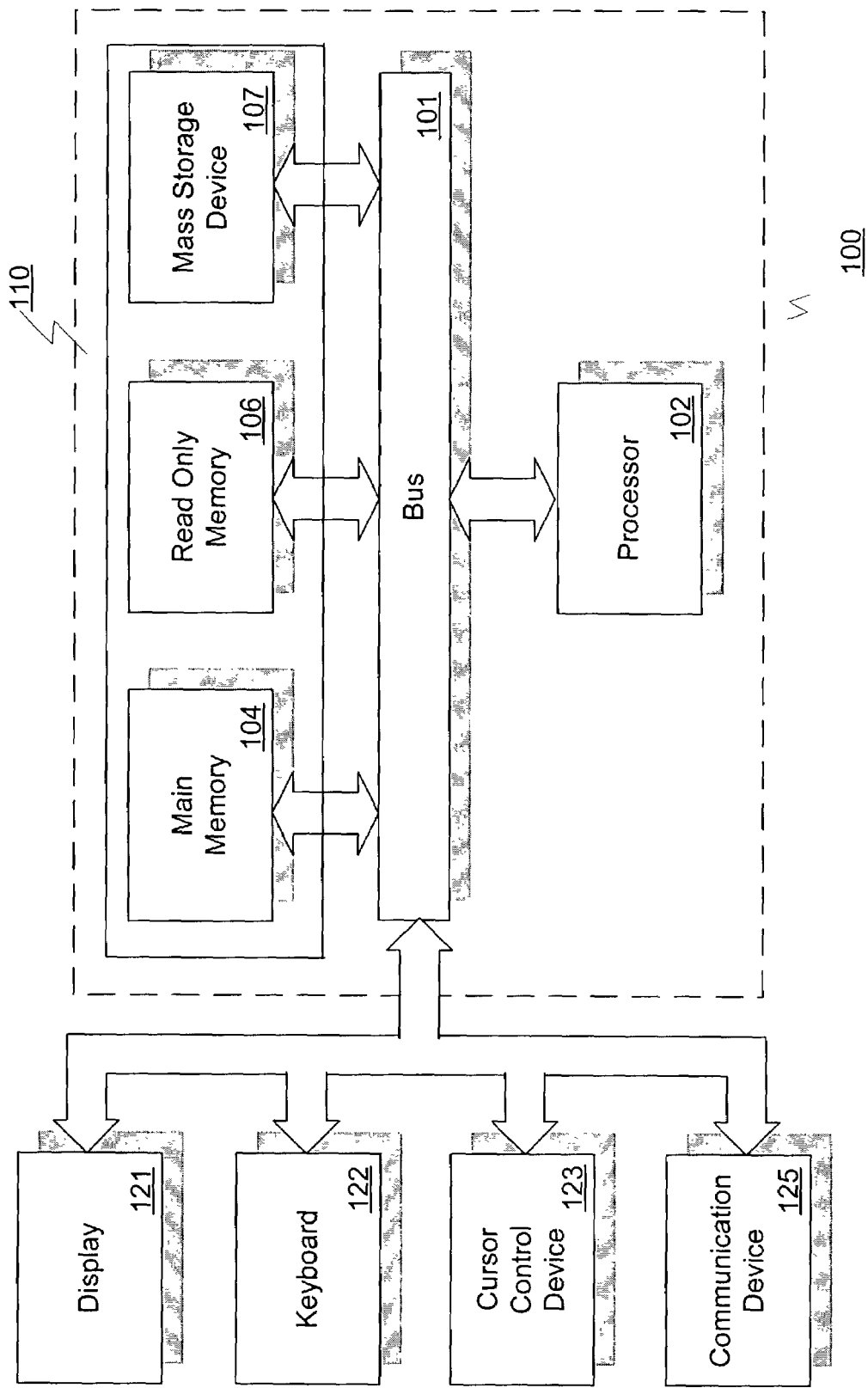
FIG. 1 is a block diagram of a typical computer system upon which one embodiment of the present invention may be implemented.

A method, apparatus, and system are described for a configurable architecture for managing corporate and industry knowledgebases for a set of customers. Broadly stated, embodiments of the present invention allow configuration of host-based data and host-based rules by the host's one or more customers on customer's instances.

A method, apparatus, and system are provided for the customers, along with the host, not only configure and tailor the host knowledgebase, but also the environment in which the knowledgebase is delivered. According to one embodiment of the present invention, a configurable architecture may be comprised of a host instance; one or more customer instances; a remote configuration engine for a content factory to deliver data comprising content and associated metadata to the host instance, which then may deliver the metadata to one or more customer instances; and a customer configuration engine for the customer instance to configure and tailor the data and the environment in which the data is delivered according to the needs and wants of the customer corresponding to the customer instance.

According to one embodiment, using a remote configuration engine, a remote content factory may deliver content and associated metadata to a host instance, and the host instance may deliver the metadata to one or more customer instances.

According to another embodiment, using a customer configuration engine, a host instance may deliver content, associated metadata, and rules to one or more customer instances. The one or more customer instances may configure the content, metadata, and rules with customer-defined content, metadata, and rules based on corresponding customer profiles.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while embodiments of the present invention will be described with reference to viewers and streaming video, the apparatus and methods described herein are equally applicable to various other types of media and multimedia. For example, viewers and/or listeners may receive steaming audio and video, streaming audio, text, graphics, animation, data, and the like.

FIG. 1 is a block diagram of a typical computer system upon which one embodiment of the present invention may be implemented. Computer system 100 comprises a bus or other communication means 101 for communicating information, and a processing means such as processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102.

A data storage device 107 such as a magnetic disk or optical disc and its corresponding drive may also be coupled to computer system 100 for storing information and instructions. Computer system 100 can also be coupled via bus 101 to a display device 121, such as a cathode ray tube (CRT) or Liquid Crystal Display (LCD), for displaying information to an end user. Typically, an alphanumeric input device 122, including alphanumeric and other keys, may be coupled to bus 101 for communicating information and/or command selections to processor 102. Another type of user input device is cursor control 123, such as a mouse, a trackball, or cursor direction keys for communicating direction information and command selections to processor 102 and for controlling cursor movement on display 121.

A communication device 125 is also coupled to bus 101. The communication device 125 may include a modem, a network interface card, or other well-known interface devices, such as those used for coupling to Ethernet, token ring, or other types of physical attachment for purposes of providing a communication link to support a local or wide area network, for example. In this manner, the computer system 100 may be coupled to a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 100 will vary from implementation to implementation depending upon numerous factors, such as price constraints, performance requirements, technological improvements, and/or other circumstances.

It should be noted that, while the steps described herein may be performed under the control of a programmed processor, such as processor 102, in alternative embodiments, the steps may be fully or partially implemented by any programmable or hard-coded logic, such as Field Programmable Gate Arrays (FPGAs), TTL logic, or Application Specific Integrated Circuits (ASICs), for example. Additionally, the method of the present invention may be performed by any combination of programmed general-purpose computer components and/or custom hardware components. Therefore, nothing disclosed herein should be construed as limiting the present invention to a particular embodiment wherein the recited steps are performed by a specific combination of hardware components.

Figure 2:
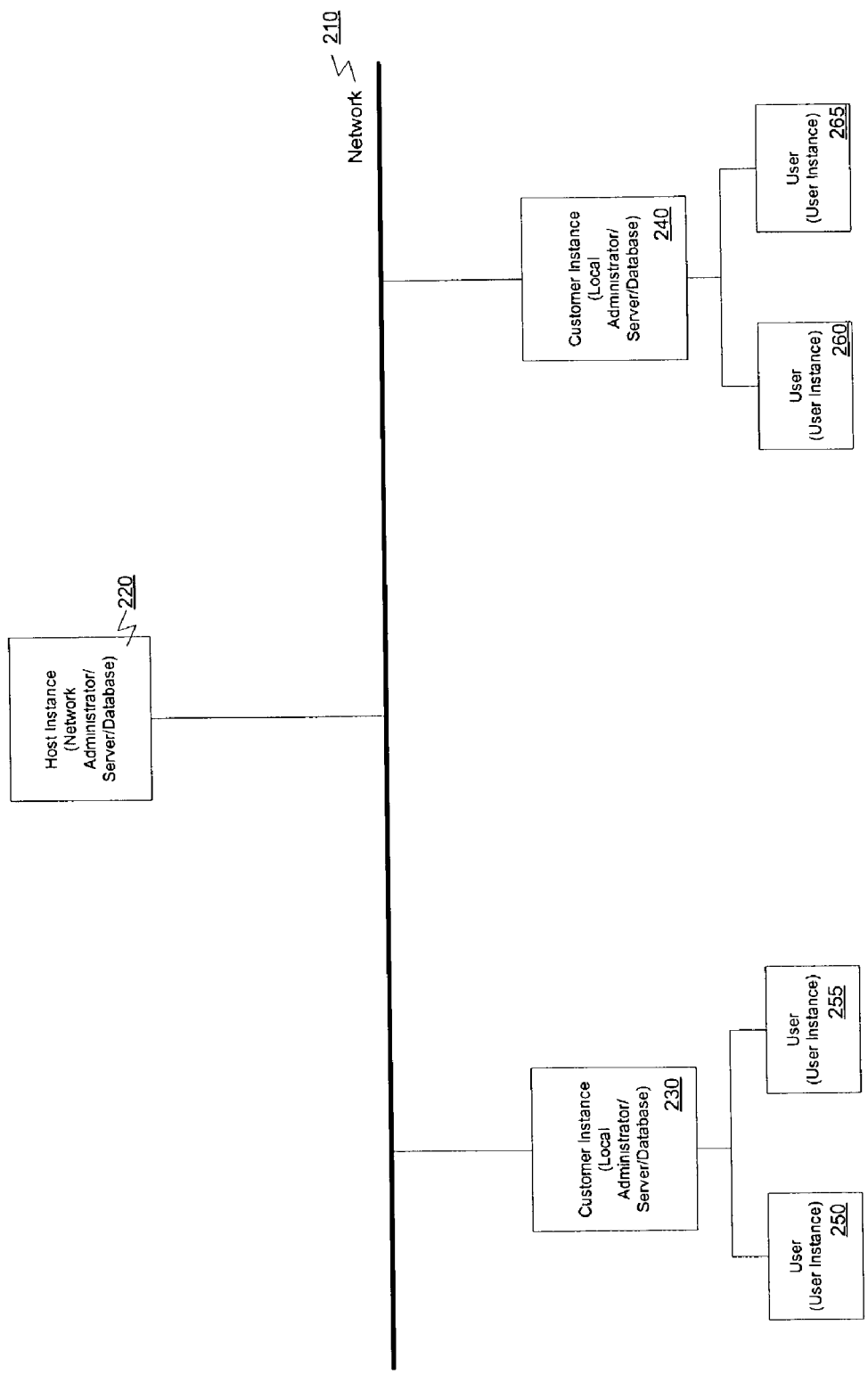
FIG. 2 is a block diagram conceptually illustrating an exemplary hierarchical network in which the present invention may be implemented.

FIG. 2 is a block diagram conceptually illustrating an exemplary hierarchical network in which the present invention may be implemented. Many types of networks and protocols are available, and may be used. However, for illustrative purposes only, Ethernet 210 may be used downstream to the customer instances 230-240 and further downstream to the users 250-265. Such a network may utilize Transmission Control Protocol/Internet Protocol (TCP/IP). Of course, many other types of networks and protocols are available and are commonly used. For instance, the network 210 may connect network nodes using fiber optics, twisted pairs, coaxial cables, serial cables, parallel cables, telephone lines, telephone modem, Universal Bus Service (USB), token rings, telephone modem, microwave connections, and the like, or combination thereof.

Connected within the network 210 are host instance 220 connected with customer instances 230-240, which are connected with users or user instances 250-265. The number and arrangement of this network 210 may vary depending on the application. A network administrator server for administering the network 200 may reside with the host instance 220, which may be coupled with a host database, such as Oracle® 8i. The host database may be coupled with the host instance 220 through a connection network node. The customer interfaces may also be coupled with a variety of customer databases. The host instance 220, however, may be coupled to the host database and customer databases. The network components and databases may be physically integrated or segregated or both, and may be located anywhere in the world. Further, the host instance 220 provides information to customer instances 230-240, and where the customer instances 230-240 are allowed to request and configure such information based on customer and user profiles.

The customers instances 230-40 provide the information to the users 250-65, wherein the users 250-65 may request the customers instances 230-40 for a different set of information. The receiving and delivering of information within the network 210 may require a receiving system and/or a delivery system, subsystems, additional network nodes, and the like, or combination thereof. The users 250-65 may access the network 210 using a variety of methods, such as, for example, via the Internet. The users 250-65 may use a personal computer or workstation to access the Internet. The access may be achieved using a local network, or a dial-up modem connection via an Internet Service Provider (ISP).

The network 210 may have several modules coupled to one another. For instance, a software module may be coupled to another module or to the host instance 220 to receive variables, parameters, arguments, pointers, and other information. A software module may be a module for importing, exporting, integrating, and configuring the information interfacing with it. A software module, compatible with a variety of operating systems, may also be a software driver to interface with the operating system running on the platform. Further, a software module may be a hardware driver to configure, setup, initialize, send and receive data to and from a hardware device.

The network 210 may correspond to any topologies and protocols. Some of the examples are the Internet, Local Area Network (LAN), Wide Area Network (WAN), broadcast network, etc. The transmission medium may be any suitable communication medium, such as air, cable, electromagnetic, optic, etc.

Figure 3:
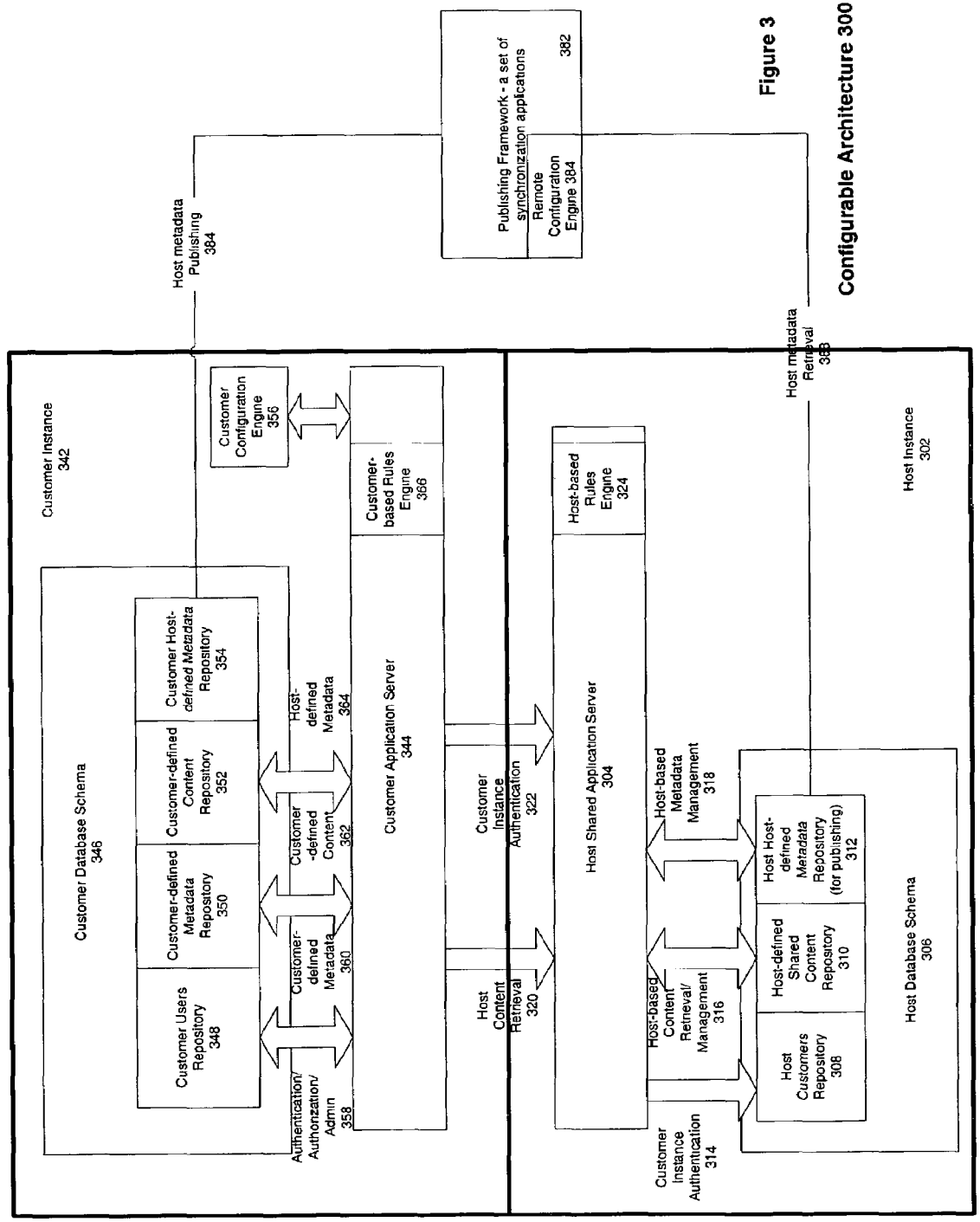
FIG. 3 is a block diagram conceptually illustrating an overview of a configurable architecture, according to one embodiment of the present invention.

FIG. 3 is a block diagram conceptually illustrating an overview of a configurable architecture, according to one embodiment of the present invention. As illustrated, the configurable architecture 300 comprises a host instance 302 and a customer instance 342.

According to one embodiment, the host instance 302 may be deployed within the host environment. The host instance 302 may comprise a host shared application server (host server) 304. Although the host server 304 may be deployed within the host instance 302, it may be shared by all customers, subject to limitations imposed by the host instance 302. Customers may access the host server 304 at different points in time or simultaneously. The host server 304 may comprise a host database schema (host schema) 306 containing a host repository of customers or host customers repository (customers repository) 308, host-defined shared content repository (host-defined content repository) 310, and host host-defined metadata repository 312. The host instance 302 may have a host-based rules engine (host rules engine) 324 for supporting the host-defined rules to govern the delivery of information from the host instance 302 to the customer instance 342.

According to one embodiment, the customer instance 342 may be deployed either within the host environment or customer environment or within a combination thereof. A customer application server (customer server) 344 may be deployed within the customer instance 342, and may be accessed by the corresponding customer, and may not be accessed by other customers. The customer server 344 may comprise a customer database schema (customer schema) 346 containing a customer users repository (users repository) 348, customer-defined metadata repository 350, customer-defined content repository 352, customer host-defined metadata repository 354. The customer instance 342 may have a customer-based rules engine (customer rules engine) 366 for generating and executing customer-defined rules to configure host-defined rules, and a customer configuration engine (CCE) 356 for configuring the host-defined rules as well as host-defined content and host-defined metadata.

According to one embodiment, the customers repository 308 on host instance 302 may contain information relating to each of the customers. The information may include general information, such as customer name, type, location, and specific information, such as customer's business structure, business objectives, and types of projects as defined by the customer. The customer-related information stored in the customers repository 308 may be generic or general, relating to all customers, or specific, relating to only an individual customer, or a combination thereof. According to one embodiment, the customer-related information may be based on the information provided by the customer.

By way of example, according to one embodiment, a customer profile corresponding to each customer may be stored in the customers repository 308, and a user work profile (user profile) corresponding to each user may be stored in the users repository 348. The customer profile may include standardized customer-related data, as provided by the customer, including customer's industry segment, size of business, type of business, and geography. The customer profile may also include aggregated information relating to the customer's users. The user profile, on the other hand, may include standardized user-related data, as provided by the user, including position, job category, years of experience, marketing and domain expertise. The user-related information may include general information, such as the user's name, title, location, and position, and specific information, such as the user's needs and responsibilities, and types of projects as defined by the user.

The information, as described in the above paragraph, may be associated with job-driven metadata driving much of the user's work experience in the system using the configurable architecture 300. Users may also extend their user profile to include metadata for areas of marketing interest, such as field marketing and advertising development. The combination of the two types of metadata may help deliver material that is directly relevant to the user's responsibilities for getting the work done, but may also allow for learning, exploring, and the serendipity of new areas as a supporting feature. The system using the configurable architecture 300 may function as an "intelligent guide" for the users to get their job completed faster, efficiently, and effectively.

According to one embodiment, the user-related information contained in the users repository 348 may be obtained partially or fully from the customer-defined content repository 352. For example, user John may provide a resume indicating his position (Director) with the ABC Corp., and his marketing plan for the company. This information may be uploaded and temporarily stored in the customer-defined content repository 352 in form of files and documents, before the specific information, such name (John), position (Director), and title of the marketing plan may be copied or moved to the users repository 348. However, the files or documents, such as the marketing plan, the resume, which may be in Word® format, may stay within the customer-defined content repository 352.

According to one embodiment, the host-defined content repository 310 may contain host-defined content. Host-defined content may contain files and/or document relating to the various services provided by the host to the customers, and ultimately to their users. Further, host-defined content may be updated dynamically according to predetermined criteria, or manually, when needed, by host content retrieval/management (content management) 316. Updating the host-defined content repository 310 may include adding, amending, or deleting contents of the host-defined content repository 310.

According to one embodiment, customers may have access to the host-defined content repository 310, limitations of which may depend on the type of permission provided by the host or customer administrator. For example, the permission on host instance 302 might be distributed in such a way that each customer can see only content in a particular set of categories. Customer users might never alter/delete host-based content on the host instance 302. The host may provide such permission to customers on a customer-to-customer basis. The permissions to view/modify the customer host-defined metadata 354 associated with the host-based content may be granted by customer administrator on per-use base. Further, certain limitations, such as expiration of permission, may be associated with permissions.

According to one embodiment, host-defined content and customer-defined content may collectively be called Knowledge Center (KC) content. The host-defined shared content repository 310 may be called Host KC, and the customer-defined content repository 352 may be referred to as Customer KC. The following may be the major areas of product where the KC content may be exposed: (1) category-organized KC view, which may be designed exclusively for the users of the customers, and therefore, the KC content may not be modified from this view. However, the content may be browsed, searched and downloaded and/or printed by the customers and their users; (2) folder-organized KC view, which may be designed for content administrators on the customer instance 342 and host instance 302. Further, the KC content may be updated and retagged using this view; and (2) delivered through the system by the host to other areas of the product, including project management, for managing the KC content.

According to one embodiment, for example, KC content may be browsed and searched by marketing category (primary), marketing subcategory (secondary), marketing activity or concept tertiary, work cycle (i.e., "plan," "do," and "renew"), source (i.e., host-based content repository or customer-based content repository), and content type (i.e., case study, wizard, checklist, scorecard, etc.). The KC content may also be classified as being a type of material in one of the following three categories: "learn it", "see it", and "apply it" corresponding to a document that may teaches, visualizes, or illustrates or allow users to apply a certain technique.

The KC content may be represented by the host asset objects of the corresponding type and one or more documents associated with each object, stored, for example, either in the Oracle® database (managed assets) or in the file system (read-only assets). By way of example, the following content types may be supported: (1) documents, including white papers, case studies, best practices, examples, reports, training modules (flash, video), and spreadsheet-based calculators; (2) programmed modules, including checklists, scorecards, web-based calculators, wizards, web-based training modules; (3) web forms (authoring form & presentation template); (4) tools; and (5) alternative views, including print view—print-friendly version of an asset, form template and downloadable versions, e.g., the MS Word® version of the template associated with a particular web form.

According to one embodiment, users and customers may browse and navigate the KC content and metadata using a list of categories. By way of example, the primary categories may include: (1) end-to-end processes, including brand building, strategy development, business planning and tracking, and product development; and (2) core marketing processes, including advertising, channel management, competitive assessment, consumer promotions, direct marketing, franchise marketing, interactive marketing, management skills, market research, media planning, packaging, portfolio management, pricing, public relations, and trade marketing.

According to one embodiment, KC content and metadata may be configured, tailored, and personalized. The KC content and metadata may be in a standardized format (i.e., XML, HTML, etc.), or the system, using the configurable architecture 300, may support translation of various input formats into a standardized internal format. The KC content may be classified so that the customers and their users may browse, search, and navigate at least, but not limited to (1) generic content, (2) customer-related content, such as brand or division specific brand content, and (iii) a combination thereof.

Further, KC content, according to one embodiment, may be displayed as standard web material (e.g., as browsable web pages in an easy to read format), and to have appropriate metadata tagging. Typically, the presentation layer for such KC content may be separated from the data layer so that different Graphical User Interfaces (GUI) may be used for the same KC content. Further, KC content may have metadata tags, and therefore, may be searchable and indexed. However, it is contemplated and noted that users and customers may have access to limited KC content depending on the permission granted by the host to their customers, and similarly, by the customers to their users. The permissions may depend on the customers' and the users' roles, current set of projects and tasks in which they may be participating. Host-defined content (also known as generic content) may be modifiable only by the host instance 302, and by customers if permitted by the host, while the customer-defined content (also known as company-specific content) may be modifiable by the corresponding customer and the host. The permissions to view/modify the customer host-defined metadata 354 associated with the host-based content can be granted by customer administrator on a per-use base.

According to one embodiment, the separation of the customer-defined content repository 352 and the host-defined shared content repository 310 may provide for content storage separation, and consequently, may provide more control to the customers, resulting in a customer-side deployment type system. According to one embodiment, the KC content may be updated dynamically in case of a change or based on a predetermined criteria, and manually, or with a combination thereof.

According to one embodiment of the present invention, host-defined content may be imported into the host-defined content repository 310 from any type of content factory teamsite (content factory), where the content initially may have been generated. Similarly, host-defined metadata of the host host-defined metadata repository 312 may also be imported from the same content factory. The content factory may be supplied with the raw information content, such as a treatise on advertising, tips, or any type of information in any form from any source. The user of the content factory may determine what content is usable, what to do with it, how to make it something that the end user can access, and how to make it usable in a web-based environment.

Once the content factory has the raw information content, it may be interacted to modify the raw content. A domain expert, an expert in specific area, according to a strategic plan for each topic, may rewrite the raw material while adding his own perspective and insight to make the material richer. Another domain expert may verify and audit the content of the first domain expert's product, helping to refine or improve it. A copy editing process may then adjust the tone and voice of the content to ensure consistency with other content in the library. An HTML developer may then create a web-based version of the content. For example, a template may be turned into an HTML form. A metatagging process then assigns attributes to the content describing the content so that the contextual relevance engine may later find the content. The result of this process is content in web-ready format with metatags. Fields in a form may be stored as XML or as database fields The content and the associated metadata may be imported from the content factory into the host instance 302 using the remote configuration engine (RCE) 384 with the publishing framework 382. According to one embodiment, the content factory export component may be used to export the content and metadata from the content factory. A host instance 302 import component may be used to import the exported content and metadata into the host instance 302. Further, the content and associated metadata imported from the content factory may not require mapping of the metadata with the host-defined metadata in the host host-defined metadata repository 312. The imported metadata may simply be added to the host-defined metadata repository 312, or substituted for the host-defined metadata in the host host-defined metadata repository 312, and the like, or a combination thereof.

According to one embodiment, the host host-defined metadata repository 312 of the host instance 302 may contain host-defined metadata, such as metadata dictionary, metadata terms, and/or content descriptors. The host-defined metadata may be used to tag or associate with the host-defined content to provide common description to the host-defined content. The metadata may comprise common vocabulary so that it may be understood throughout the system. The metadata may include terms, phrases, or descriptive paragraphs for describing content.

Further, according to one embodiment, the host-defined metadata may be periodically updated, based on a predetermined criteria or whenever necessary, or manually updated with new and/or amended vocabulary by the host metadata management 318. The content factory may provide the most recent version of the metadata to the host-defined metadata repositories 312 and 354. This may create and sustain uniformity and common understanding of the terms/vocabulary/descriptors, so that the description of the content may be fully and correctly understood by all the components within the configurable architecture 300 and the system.

According to one embodiment, metadata may comprise content or media descriptor tags that may characterize a logical grouping of content, also known as packages, so that the content may be used efficiently and intelligently within a given system. A package may include elements or content, such as HyperText Markup Language (HTML) pages, MP3 files, QuickTime movies, video clips, audio clips, and any other suitable content. The package may be independent of the system and transmission mechanism and policies. Further, the package may be represented with a unique identifier and markup language data. According to one embodiment, the metadata may be associated with the content thereby attaching description to the content, and therefore, generating and/or packaging descriptive content.

According to one embodiment, the metadata may include support for a default set of metadata for major classes of objects important to the content, such as marketing database including brand assets, folders, projects, action items (tasks) and people. To properly support this, object types may include:

wizards, wherein a wizard may be represented as or comprise a series of steps where each step may have files, text, graphics, display text, text to be entered by a user, application behavior, links to external tools, exception handling, etc. To support the requirements of a wizard an XML metadata model and data structure may be used, which may be a meta-level object with asset lists, metadata categorization, snippets of text and graphics for display, XSL style sheet or suitable template to drive rendering of page(s), ability to be used as a wizard. Additionally, the third party packages may be used to represent wizards, such as Flash and PowerPoint®;

(2) applications and tools, wherein the applications and tools may represent internal corporate applications, external web applications or tools, or combinations of both. Applications and tools may have invocation methods and may also be tagged with metadata. Applications may also have permissions associated with them, which can be placed into folders, and may be searchable, like assets and projects. These applications and tools may be delivered to customers, and ultimately to their users, based on their roles and responsibilities mapped with the metadata of the tools;

(3) document templates, for common marketing work tasks (i.e., a creative brief standard template as a Word® document) may be built into the system within predefined brand information architecture. There may be a set of generic brand asset files and document templates that can be used in a variety of work tasks;

(4) project templates (with pre-populated document templates), wherein the project templates may include sets of standardized document templates and forms. These standard document templates may form a permanent component of the project template;

(5) web page templates, wherein the web page templates may translate various representations of content into rendered and navigable web pages. The concept of a web page template may be crucial to present a large collection of information as an "easy to read, view and navigate" set of web pages that may be delivered to the customers, and ultimately to their users, based on their current work focus; and (6) training tools, wherein the training tools may be represented on the system as PowerPoint® presentation, Flash, or Shockwave. These tools may also include a quiz element. The tools may be associated with a project or task, and may be accessible through a shared-files area or through a dedicated area of the system;

(7) generic documents, wherein, according to one embodiment, as mentioned above, metadata may be imported into the host host-defined metadata repository 312 from an external/remote content factory using the remote configuration engine (RCE) 384. As with the content, the content factory export component may be used to export the metadata from the content factory. The host import component may be used to import the exported host-defined metadata.

According to one embodiment, the host-defined metadata may also be imported by the remote configuration engine (RCE) 384 in the customer schema 346. As with the host host-defined metadata repository 312, the customer host-defined metadata repository 354 in the customer instance 342 may also import the host-defined metadata using the remote configuration engine (RCE) 384.

According to one embodiment, customers may have access to host-defined metadata within the limitations of the permission provided by the host instance or customer administrator. The host instance may provide a full permission (read and write permission), read-only permission, and the like, or a combination thereof. Full permission may include permission to update customer host-defined metadata 354, i.e., to delete, amend, and add.

According to one embodiment, the customer-defined metadata repository 350 may be populated with customer-defined metadata. In other words, customers may generate their own metadata independent of the host-defined metadata. The customer-defined metadata may be linked and/or associated with content in the customer-defined content repository 352. Further, the customers may configure host-defined metadata using the CCE 356 to generate customer-defined metadata or map the host-defined metadata with the customer-defined metadata.

According to one embodiment, the configuration architecture 300 may have a contextual relevance engine (CRE) to provide an ability to dynamically retrieve objects associated with each other via metadata. The CRE, on the host instance 302, may employ a host-based rules engine (HRE) 324 to generate rules to identify what objects and metadata may participate in the retrieval process. The customer, however, may generate customer-based rules using the customer-based rules engine (CRE) 366, and may configure and tailor the host-based rules with the customer-based rules using the using the CCE 356.

According to one embodiment, to provide a customer with the ability to configure and tailor metadata, workflows, template projects, and rules, the host instance 302 may have to first recognize the customer. To support this objective, initial customer registration and profile may be required. Aside from basic information, such as customer name, location, business type, the customer profile may include a rich description of a customer's goals and specializations. It may even include the customer's users' profiles including the users' individual roles and responsibilities and their marketing specializations. Once the initial registration and profiling is concluded, the customer may be assigned a userID and password, or the like, or a combination thereof. Subsequently, the customer may enter userID and/or password, which may trigger the customer instance authentication (customer authentication) 314 to verify and authenticate the customer before providing access to the host instance 302 and service provided by the host instance 302. A customer may employ a similar verification, authentication, and profiling system for its users.

According to one embodiment, conventional technologies may be used, together with any desirable modifications that will be apparent to those skilled in the art. For example, the system may comprise a conventional processor to execute instructions, a conventional memory to store content, a conventional encoder to encode content, a conventional transmitter to transmit content containing signal, a conventional receiver to receive content containing signal, and a conventional decoder to decode content.

Figure 4:
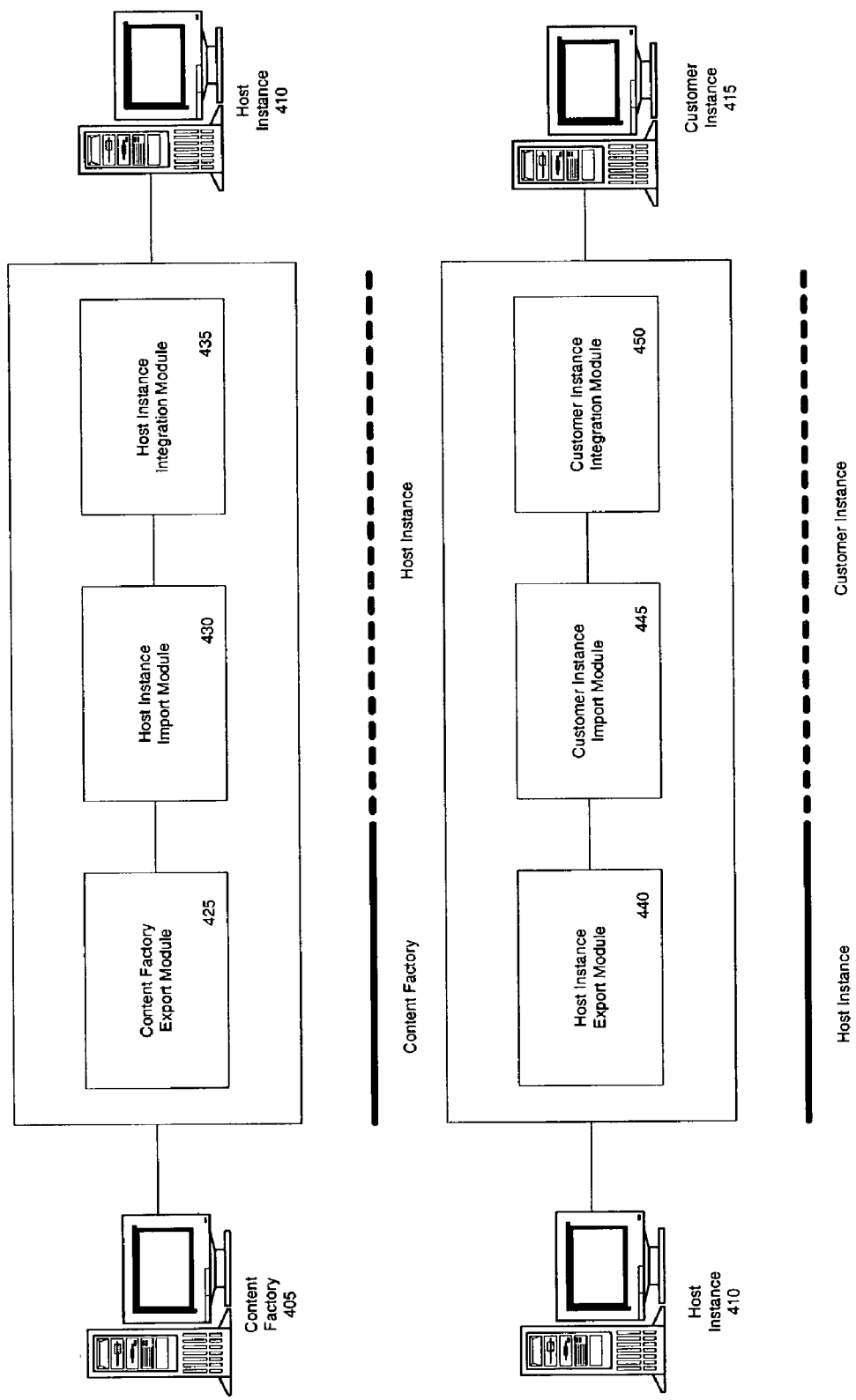
FIG. 4 is a block diagram conceptually illustrating remote configuration engine, according to one embodiment of the present invention.

FIG. 4 is a block diagram conceptually illustrating remote configuration engine, according to one embodiment of the present invention. As mentioned above, with respect to FIG. 3, the publishing framework 382 employs a remote configuration engine 384, now 400, to import content and associated metadata from a remote/external content factory 405, to the host host-defined metadata repository 312 and host-defined content repository 310 in the host instance 302, now 410, and to the customer host-defined metadata repository 354 in the customer instance 342, now 415.

As illustrated, according to one embodiment, the content factory 405 may deliver the content and metadata dynamically for updating the content and metadata already in the host instance 410, or whenever the content and metadata is requested by the host instance 410. Further, the metadata imported from the content factory 405 may be exported to the one or more customer instances 415. According to one embodiment, the host instance 410 may export the metadata, received from the content factory 405, to the customer instance 415, however, it is contemplated that in certain circumstance, the customer instance 415 may directly import the metadata from the content factory 405.

According to one embodiment, the content factory 405 may deliver content and metadata using the content factory export module 425. The content factory export module 425 may be used to convert the content and metadata into the immediate format supported by the host instance 410. The host instance import module 430 may import the content and metadata, and forward the content and metadata to the host instance integration module 435. The host instance integration module 435 may integrate the content and metadata with content already in the host-defined content repository 310 and metadata already in the host host-defined metadata repository 312 at the host instance 410.

According to one embodiment, the content may be exported in the original file format, whereas the metadata associated with the content files may be exported in the form of XML document. The name of the XML document may be constructed as <content file name>+.xml extension, and the XML document may be resided in the same directory with the corresponding content document.

According to one embodiment, the types of content may include, but are not limited to: (1) project template, which may be defined as XML file with the complete project template definition, including, but not limited to, tasks, steps, actions, dependencies and associated docs. The new project templates may be created, when receiving metadata from the content factory 405, by disabling the old project templates and replacing them with the new ones. The disabling of the project templates may comprise removing the current project templates from the list of available project templates by the project management administration, using appropriate tools. The disabling of the project templates may be dynamic or manual, or a combination thereof.

(2) managed asset with metadata, including asset and metadata stored in a database, such as Oracle®. The search of asset in the system/database may be conducted using the same Global ID. In the case of an existing asset in the system that matches the search criteria, it may be checked-out, and checked back in with the new file and the new metadata. However, if there is no existing asset in the system that matches the search criteria, a new asset may be uploaded specifying the new metadata;

(3) external assets with metadata, including assets stored on the file system, and asset metadata may be stored in a database, such as Oracle®. The asset Global ID may be read from the XML file to search for an asset in the system with the same Global ID. If there is an existing asset in the system that matches the search criteria, the existing asset may replace the corresponding file on the file system with the new one and update the metadata in the system, by first copying the old file in the new location, and after that updating the metadata to the new location once the old version is deleted. If there is no existing asset in the system that matches the search criteria, the asset may be copied to the specified location and after that corresponding object may be created in the EMM database;

(4) object type definition, which may be stored in the XML format, using the XML framework and the same logic used for the catalog update tool; and (5) object field definition, including enumerations. The object field definition may be stored in the XML format, using the XML framework and the same logic used for the catalog update tool.

According to one embodiment, the integration and configuration of metadata may include, but is not limited to: (1) metadata last modification date, which may be updated automatically as part of the content factory framework every time the new metadata is created or existing metadata is modified; (2) content last modification date, which may be updated automatically as part of the content factory framework every time the new metadata created or existing content file updated; (3) global ID, which may be set automatically every time the new metadata record is created within the content factory framework. The global ID may be unique for different assets. It may be the same for web form and form template associated with it. Further, it may be same for any asset and printer-friendly version of the same asset. The global ID may be a text field of which the values might have different prefixes; and (4) asset type, i.e., the type identifier of the asset, may be best practice, web form, form template, print view, and the like, or a combination thereof.

According to one embodiment, the host instance export module 440 may deliver host-defined metadata to the customer instance import module 445. The customer instance import module 445 may import only the metadata that matches the metadata purchased and/or ordered by the corresponding customer, and for which the customer was authorized. Further, the host instance export module 440 may export the metadata in a portable format based on a predetermined criteria comprising predetermined export rules. The customer instance import module 445 may forward the metadata to the customer instance integration module 450. The metadata is integrated with the metadata already in the customer host-defined metadata repository 354. Such integration may not require mapping of the metadata, as the metadata is host-defined and may be stored as host-defined, and may be in the same format, at the customer instance 415. Since customer might use different working for the metadata imported from the host instance 410, the ability to map the metadata values based on the customer configuration is supported by the customer instance integration module 450.

Figure 5:
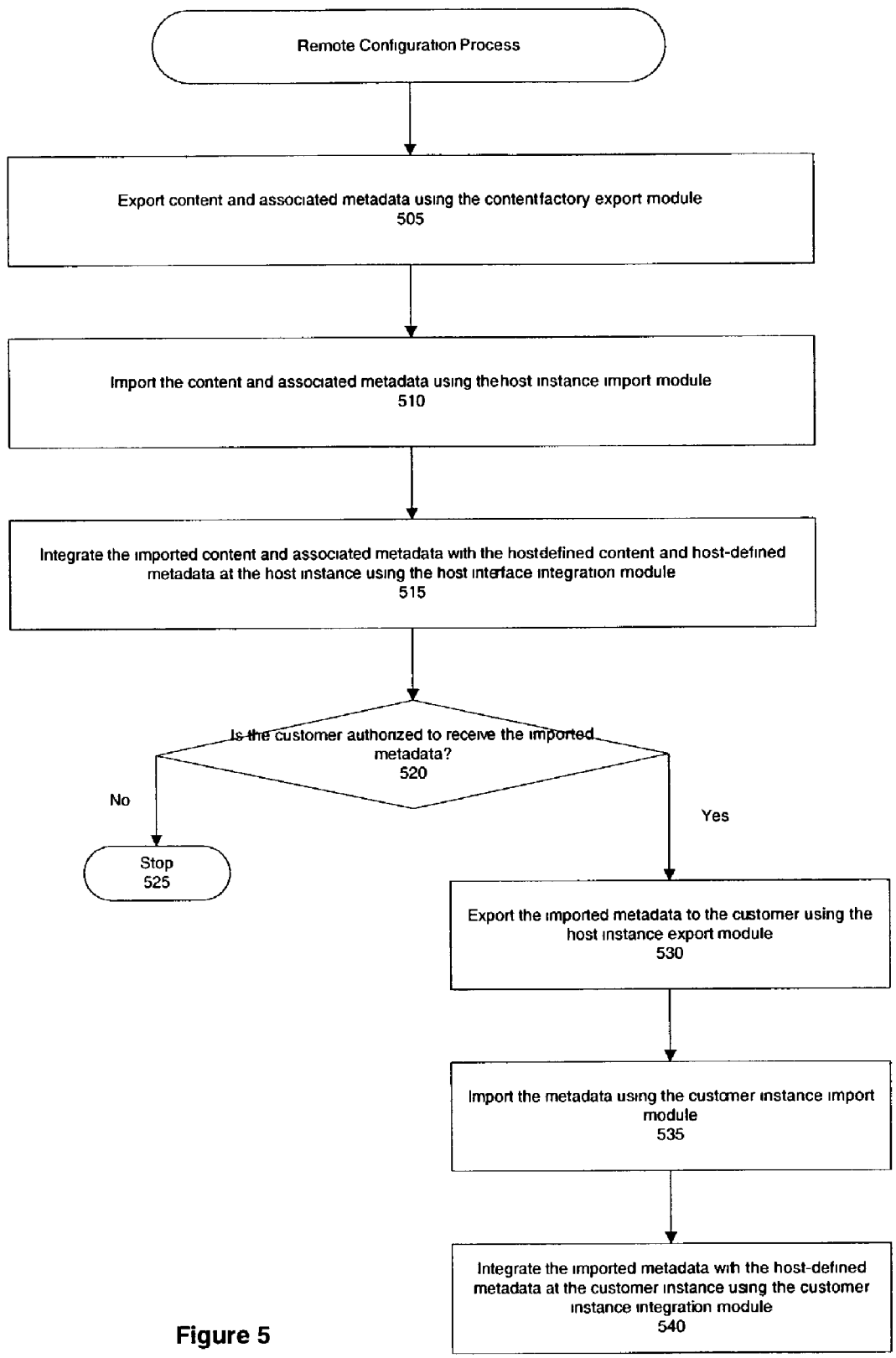
FIG. 5 is a flow diagram conceptually illustrating the remote configuration process using remote configuration engine, according to one embodiment of the present invention.

FIG. 5 is a flow diagram conceptually illustrating the remote configuration process using remote configuration engine, according to one embodiment of the present invention. First, according to one embodiment, content and metadata is exported from a content factory using the content factory export module in processing block 505. The content and metadata may have been generated at the content factory. The content and metadata may be imported by the host instance import module in processing block 510. The imported content and metadata may then be integrated into the host-defined content and host-defined metadata already at the host instance by the host instance integration module in processing block 515.

According to one embodiment, a customer may request, and be authorized, to receive the host-defined metadata for storing the host-defined metadata at the customer instance. At decision block 520, if the customer is not authorized to receive the host-defined metadata, the process may stop in processing block 525. However, if the customer is authorized to receive the host-defined metadata, the host instance export module may export the host-defined metadata to the corresponding customer in processing block 530. The customer instance import module may receive the host-defined metadata in processing block 535. Finally, the customer instance integration module may integrate the host-defined metadata with the host-defined metadata already at the customer instance in processing block 540. Such integration may include deleting of the old host-defined metadata, adding of the new host-defined metadata, changing/amending/updating of the old host-defined metadata with the new host-defined metadata, and the like, or a combination thereof.

Figure 6:
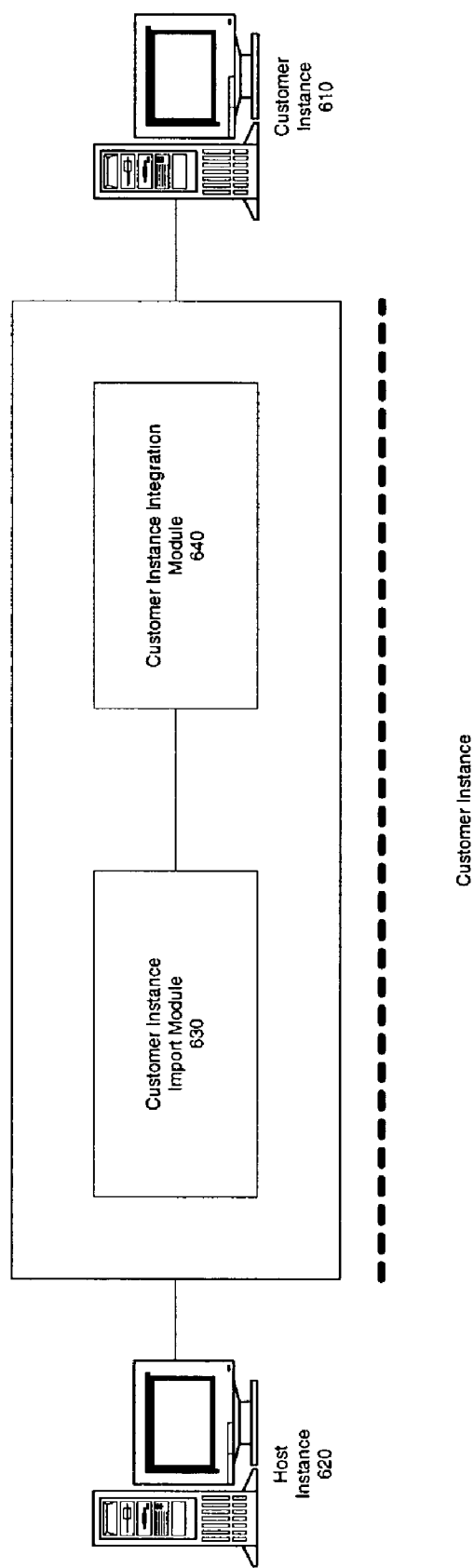
FIG. 6 is a block diagram conceptually illustrating a customer configuration engine, according to one embodiment of the present invention.

FIG. 6 is a block diagram conceptually illustrating a customer configuration engine, according to one embodiment of the present invention. The customer configuration engine 600 may provide a customer with the ability to configure and tailor host-defined data and host-defined rules to their needs and wants. The host-defined data may include host-defined documents, host-defined metadata, host-defined workflow models, and host-defined project templates. Further, host-defined documents, host-defined workflow models, and host-defined project templates may collectively be called host-defined content. Configuration may be used within the hierarchical and configurable library of knowledgebase or knowledge center. The customer may create its own documents, metadata, workflow models, project templates, and rules, and use them to configure and tailor host-defined documents, host-defined metadata, host-defined workflow models, host-defined project templates, and host-defined rules.

As mentioned above, with reference to FIG. 3, the host-defined metadata may include tags to be associated with the host-defined content to provide common description to the host-defined content. The metadata may comprise common vocabulary so that it may be understood throughout the system. The metadata may include terms, phrases, or descriptive paragraphs for describing content.

According to one embodiment, the host-defined metadata may support the mapping of the host-defined metadata with the customer-defined metadata so that it may be delivered to customers, and ultimately to the users based on their roles and responsibilities. The types of host-defined and customer-defined metadata may support: (1) customer work profiles, which may include customer name, location, industry segment, user work profiles, marketing domain, and marketing plan, and the like, or combination thereof; (2) user work profiles, which may include user name, job title, industry segment, common work tasks, marketing domain expertise, roles and responsibilities, brand units, divisions, geographies, and the like, or combination thereof; (3) files and folders, which may include a large library of default materials, documents, and document templates. For example, the default assets and web material may be tagged with metadata describing the categories, such as marketing categories, which may allow the documents/templates to be delivered to the appropriate or corresponding customer; and (4) projects and action items, which may include a library of default workflow models and project templates. The default workflow models and project templates may be tagged with metadata describing the categories, such as marketing categories, of the workflow models and project templates, which may allow the workflow models and project templates to be delivered to the appropriate customers.

According to one embodiment, the library of workflow templates may be available as standard when a customer or user may work to create a project or a specific action item (depending on the context). By way of example, the library of workflow models may include the following workflow models: (1) fixed workflow models, in which the tasks and sub-tasks may be predefined. A fixed workflow model may also be called readymade project. A fixed workflow may be deployed on a broad scale across a system and may involve usage from multiple customers and users; (2) ad-hoc workflow models, which the customer may request, and be authorized, to develop from scratch. The development process may include building up a definition of a work process, and a step-by-step assembling all of the elements starting with an empty container. An ad-hoc workflow model may typically be used in a small project team environment, usually for short projects of limited scope and generality; and (3) configurable workflow models, where the customers may start with a fixed workflow definition, but have the ability to add, delete, or modify the existing workflow steps. Configurable workflow models may provide a great deal of flexibility in configuration and tailoring for building a new project initiative. Configurable workflow model may also be generated from a readymade project or ad-hoc workflow model to be configured to meet the specific needs of a specific customer or user.

According to one embodiment, context sensitive workflow, a specialized feature within the broader environment of the contextual relevance engine, may provide a mechanism to present intellectual property, such as marketing intellectual property, in the context of selected workflow models. The contextual relevance engine may deliver a relevant collection of materials and business processes defined as "the right content delivered to the right person at the right time." Content may comprise a combination of work materials including workflow models, project templates, document templates, wizards, static best practices, case studies, tools and applications. Such capability may be provided by mapping a customer's, and ultimately its user's, roles and responsibilities against the broad collection of available intellectual property or content, all of which may be tagged with metadata, to produce highly configured and targeted content and workflow models and project templates for the work platform. For example, specific workflow models may include metadata for principles, case studies, and tools, where these three elements may all be contextual to the workflow model that is currently active. Customers may utilize the default context-sensitive workflow model or customer content, such as marketing content, specific to a customer with the ability to configure its multiple brands.

According to one embodiment, the contextual relevance engine may provide an ability to retrieve objects associated with each other dynamically using metadata. The contextual relevance engine may use rules, generated by the rules engine to identify the objects and what metadata may participate in the retrieval process. The rules may determine the knowledge and expertise that may be delivered to the customer, and ultimately to the users. The rules engine may be designed so that the customers may view contextually relevant content and extensive customer-related information in situations where minimal customer work profile may be available (i.e., when only minimum customer-related information may have been provided by the customer).

According to one embodiment, the host instance export module 440 may export host-defined data to the customer instance import module 630 at the customer instance 610. The customer instance import module 630 may be coupled to the customer application server 344, while the customer instance integration module 640 may reside in the customer application server 344. The host-defined data may include, but is not limited to host-defined content, host-defined metadata, host-defined workflow models, host-defined project templates, and host-defined rules. The word "default" may be used synonymously with the word "host-defined." The customer instance import module 630 may forward the host-defined data to the customer instance integration module 640. The customer instance integration module 640 may integrate the host-defined data with the customer-defined data.

According to one embodiment, the integration of data may include, but is not limited to, updating, amending, and mapping of the host-defined data with the customer-defined data. It may further include deleting and reprogramming of the customer-defined data, and adding of the host-defined data. For example, the customer instance integration module 640 may map the host-defined metadata with the customer-defined metadata, to configure the host-defined metadata with the customer-defined metadata.

When integrating workflow models and project templates, according to one embodiment, the customer instance integration module 640 may substitute the host-defined (predefined and/or default) steps of the workflow models and project template with the customer-defined steps of the customer-defined workflow models and project templates. The steps may be deleted, added, amended, updated, substituted, programmed, reprogrammed, and the like, or a combination thereof.

When integrating the rules, according to one embodiment, the customer may have the authority to generate its own rules using the customer-based rules engine to substitute for host-defined rules generated by host-based rules engine 324. The customer instance integration module 640 may use the customer-defined rules stored in the customer-based rules repository on the customer instance 610 to substitute for the host-defined rules. Further, the customer may simply reprogram the host-defined rules using the customer-based rules engine 366.

Figure 7:
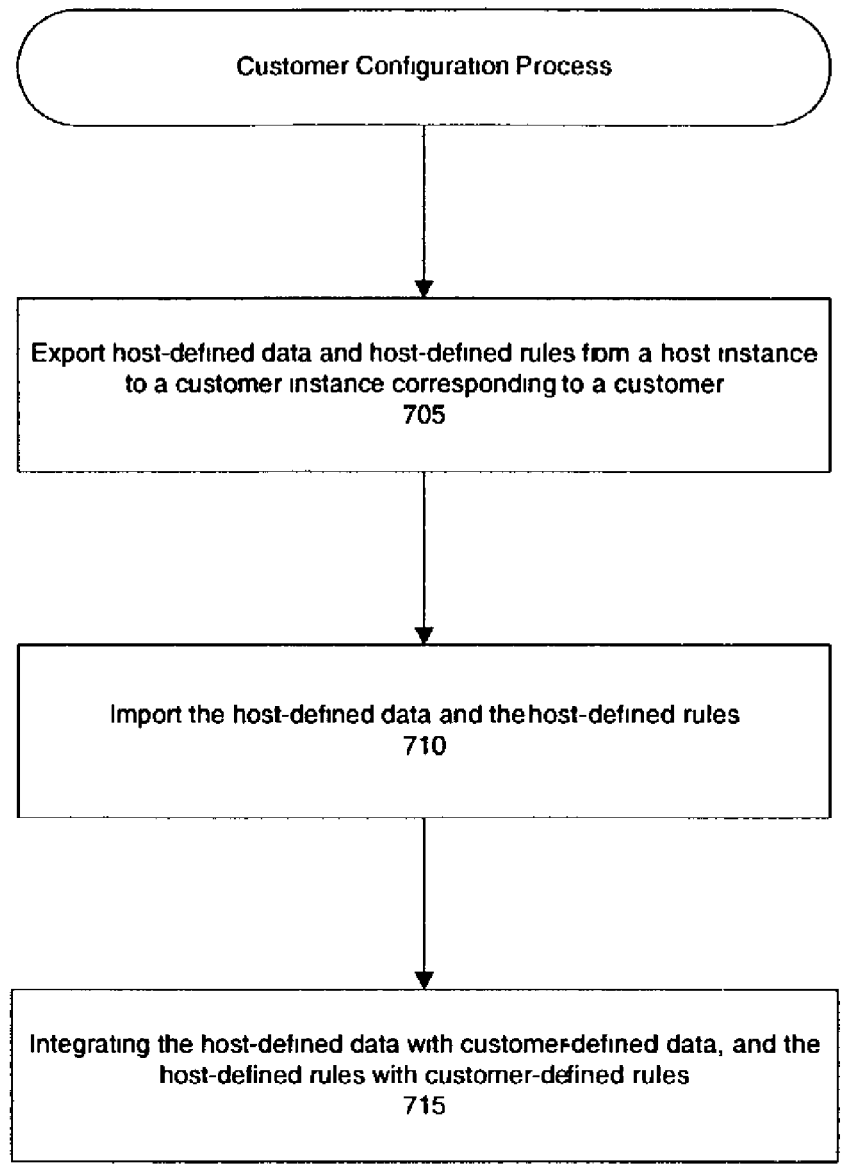
FIG. 7 is a flow diagram conceptually illustrating the process of configuring and tailoring host-defined data and host-defined rules using customer configuration engine, according to one embodiment of the present invention.

FIG. 7 is a flow diagram conceptually illustrating the process of configuring and tailoring host-defined data and host-defined rules using a customer configuration engine, according to one embodiment of the present invention. First, according to one embodiment, the host-defined data and the host-defined rules are exported from a host instance in processing block 705. The host-defined data may comprise host-defined content and associated host-defined metadata. The host-defined content may include host-defined documents and host-defined work processes. The host-defined work processes may include host-defined workflow models comprising host-defined steps/tasks, and host-defined project templates comprising host-defined steps/tasks to perform certain projects. The host-defined rules may be generated by the host-based rules engine. The rules may determine and govern the delivery of host-defined data from the host instance to one or more customer instances based on corresponding customer profile or predetermined criteria, and the like, or a combination thereof.

The host instance may have one or more customer instances, and each of the customer instances may have one or more user instances. The host instance, customer instance, and user instance may be located in one place physically, i.e., integrated, or may be separated, i.e., physically segregated. The configuration engine may have a customer-based import module to import the host-defined data and the host-defined rules in processing block 710. Having a customer-based import module may provide the customers, in addition to the host, with the ability to access, configure, and tailor the host-defined data and the host-defined rules according to their needs and wants. Further, according to one embodiment, not only the customers may configure and tailor the host-defined data, but also the host-defined rules, which means not only the host-defined content, but also the environment in which to receive the content.

Finally, the host-defined data and the host-defined rules are integrated with customer-defined data and customer-defined rules using a customer-based integration module. The integration may comprise modification, substitution, programming, addition, and deletion, and the like, or a combination thereof, of the host and customer-defined data and rules. The customers may have the ability to generate their own data, called the customer-defined data, and have a customer-based rules engine generate the customer-defined rules.

What is claimed is:

1. A configuration architecture comprising:
   a host instance comprising a host application server and a host database schema; a customer instance corresponding to a customer, wherein the customer instance comprises a corresponding customer application server and a corresponding customer database schema;
   a remote configuration engine for the host instance to receive host-defined data from a content factory, wherein the host-defined data comprises host-defined content and associated host-defined metadata;
   wherein the remote configuration engine further comprises:
   a content factory export module for the content factory to export the host-defined content and the associated host-defined metadata, wherein the content factory generates the host-defined content and the associated host-defined metadata;
   a host-based import module for the host instance to import the host-defined content and the associated host-defined metadata, and is further to forward the host-defined content and the associated host-defined metadata to a host-based integration module; and
   the host-based integration module for the host instance to integrate the imported host-defined content with the host-defined content in the host shared content repository, and the imported host-defined metadata with the host-defined metadata in the host host-based metadata repository; and
   a customer configuration engine for the customer to configure the host-defined data and host-defined rules, wherein the host-defined rules are generated by a host-based rules engine.

2. The configuration architecture of claim 1, wherein the remote configuration engine further comprising:
   a host-based export module for the host instance to export the host-defined metadata to the customer;
   a customer-based import module for the customer instance to import the host-defined metadata, and is further to forward the host-defined metadata to a customer-based integration module; and
   the customer-based integration module for the customer instance to integrate the host-defined metadata with the host-defined metadata in the customer host-based metadata repository.

3. The configuration architecture of claim 2, wherein the content factory comprises a remote content formatting and editing tool.

4. A configuration architecture comprising:
   a host instance comprising a host application server and a host database schema; a customer instance corresponding to a customer, wherein the customer instance comprises a corresponding customer application server and a corresponding customer database schema;
   a remote configuration engine for the host instance to receive host-defined data from a content factory, wherein the host-defined data comprises host-defined content and associated host-defined metadata;
   a customer configuration engine for the customer to configure the host-defined data and host-defined rules, wherein the host-defined rules are generated by a host-based rules engine; and
   wherein the customer configuration engine further comprises:
   a host export module for the host to export the host-defined data and the host-defined rules, wherein the host-defined data comprises the host-defined content and the host-defined metadata;
   a customer-based import module for the customer to import the host-defined data and the host-defined rules, wherein the customer-based import module is further to forward the host-defined data and the host-dc lined rules to a customer-based integration module; and
   the customer-based integration module for the customer to integrate the host-defined data with the customer-defined data, and the host-defined rules with the customer-defined rules.

5. The configuration architecture of claim 4, wherein the integration comprising:
   modifying the host-defined data with the customer-defined data, and the host defined rules with the customer-defined rules;
   substituting the host-defined data with the customer-defined data, and the host-defined rules with the customer-defined rules; and
   reprogramming the host-defined data and the host-defined rules by the customer.

6. A configuration system comprising:
   a host instance comprising a host application server and a host database schema, wherein the host database schema comprises host-defined data comprising host-defined content and associated host-defined metadata;
   a customer instance corresponding to a customer, wherein the customer instance comprises a corresponding customer application server and a corresponding customer database schema comprising host-defined metadata and customer-defined data comprising customer-defined content and associated customer-defined metadata;
   a host-based rules engine to generate host-defined rules;
   a customer-based rules engine to generate customer-defined rules;
   a remote configuration engine for the host instance to receive the host-defined data from a content factory; and
   wherein the remote configuration engine further comprises:
   a content factory export module for the content factory to export the host-defined content and the associated host-defined metadata, wherein the content factory generates the host-defined content and the associated host-defined metadata;
a host-based import module for the host instance to import the host-defined content and the associated host-defined metadata, and is further to forward the host-defined content and the associated host-defined metadata to a host-based integration module; and
the host-based integration module for the host instance to integrate the imported host-defined content with the host-defined content at the host instance, and the imported host-defined metadata with the host-defined metadata at the host instance; and
a customer configuration engine for the customer to configure the host-defined data and the host-defined rules.

7. The configuration system of claim 6, wherein the remote configuration engine further comprising:
a host-based export module for the host instance to export the host-defined metadata to the customer;
a customer-based import module for the customer instance to import the host-defined metadata, and is further to forward the host-defined metadata to a customer-based integration module; and
the customer-based integration module for the customer instance to integrate the host-defined metadata with the host-defined metadata at the customer instance.

8. A configuration system comprising:
a host instance comprising a host application server and a host database schema, wherein the host database schema comprises host-defined data comprising host-defined content and associated host-defined metadata;
a customer instance corresponding to a customer, wherein the customer instance comprises a corresponding customer application server and a corresponding customer database schema comprising host-defined metadata and customer-defined data comprising customer-defined content and associated customer-defined metadata;
a host-based rules engine to generate host-defined rules;
a customer-based rules engine to generate customer-defined rules;
a remote configuration engine for the host instance to receive the host-defined data from a content factory; and
a customer configuration engine for the customer to configure the host-defined data and the host-defined rules; and
wherein the customer configuration engine further comprises:
a host-based export module for the host instance to export the host-defined data and the host-defined rules;
a customer-based import module for the customer to import the host-defined data and the host-defined rules, wherein the customer-based import module is further to forward the host-defined data and the host-defined rules to a customer-based integration module; and
the customer-based integration module for the customer to integrate the host-defined data with the customer-defined data, and the host-defined rules with the customer-defined rules.

9. The configuration system of claim 8, wherein the integration comprising:
modifying the host-defined data with the customer-defined data, and the host-defined rules with the customer-defined rules;
substituting the host-defined data with the customer-defined data, and the host-defined rules with the customer-defined rules; and
reprogramming the host-defined data and the host-defined rules by the customer.

* * * * *